(12) United States Patent
Kirby, Jr.

(10) Patent No.: US 8,826,358 B2
(45) Date of Patent: Sep. 2, 2014

(54) BACK CHANNEL COMMUNICATION

(75) Inventor: Josiah J. Kirby, Jr., Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 89 days.

(21) Appl. No.: 13/534,238

(22) Filed: Jun. 27, 2012

(65) Prior Publication Data

US 2014/0007174 A1    Jan. 2, 2014

(51) Int. Cl.
| | |
|---|---|
| *H04N 7/173* | (2011.01) |
| *H04N 7/18* | (2006.01) |
| *H04N 5/445* | (2011.01) |
| *H04N 7/16* | (2011.01) |

(52) U.S. Cl.
USPC ................. 725/116; 725/85; 725/58; 725/14; 725/30; 725/131

(58) Field of Classification Search
USPC ................. 725/85, 30, 58, 14, 131; 717/169; 370/352
See application file for complete search history.

(56) References Cited

U.S. PATENT DOCUMENTS

| | | | |
|---|---|---|---|
| 2004/0250285 A1* | 12/2004 | Murphy et al. ................. | 725/75 |
| 2005/0028208 A1* | 2/2005 | Ellis et al. ....................... | 725/58 |
| 2007/0157281 A1* | 7/2007 | Ellis et al. ...................... | 725/134 |
| 2007/0188301 A1* | 8/2007 | Nakajima et al. ............. | 340/5.61 |
| 2007/0245019 A1* | 10/2007 | Westberg et al. .............. | 709/225 |
| 2009/0138907 A1* | 5/2009 | Wiser et al. ...................... | 725/34 |
| 2011/0088059 A1* | 4/2011 | Wilson et al. ................... | 725/34 |
| 2011/0179098 A1* | 7/2011 | Nogami et al. ................ | 708/207 |
| 2011/0289496 A1* | 11/2011 | Steer ............................. | 717/169 |
| 2011/0314492 A1* | 12/2011 | Cassidy et al. .................... | 725/30 |
| 2012/0002111 A1* | 1/2012 | Sandoval et al. .............. | 348/521 |
| 2012/0014382 A1* | 1/2012 | Lazzaro et al. ................ | 370/352 |
| 2012/0017250 A1* | 1/2012 | Tirasirikul et al. .............. | 725/85 |
| 2012/0159546 A1* | 6/2012 | Klein et al. ...................... | 725/40 |
| 2012/0203822 A1* | 8/2012 | Floyd et al. .................... | 709/203 |
| 2012/0291068 A1* | 11/2012 | Khushoo et al. ................ | 725/38 |

* cited by examiner

*Primary Examiner* — Pankaj Kumar
*Assistant Examiner* — Tariq Gbond
(74) *Attorney, Agent, or Firm* — Great Lakes Intellectual Property, PLLC.

(57) ABSTRACT

Back channel communications are contemplated. The back channel communications may relate to facilitating signaling from a primary device to one or more secondary devices. One contemplated type of back channel communication may include a service provider carrying the desired signaling to the secondary devices. This may occur without the primary device being aware of the secondary devices and/or without requiring the primary device to identify the secondary devices to the service provider.

18 Claims, 2 Drawing Sheets

BACK CHANNEL COMMUNICATION

TECHNICAL FIELD

The present invention relates to back channel communications, such as but not necessarily limited to facilitating back channel communications from a settop box (STB) to a device by way of indirect signals communicated over back channels of a television system.

BACKGROUND

A back channel communication may be defined as one in which signal are delivered to a device asynchronously to maintain a real-time communications.

Television system operators, such as but not necessarily limited to those associated with cable, satellite, and Internet based delivery networks, may rely on various proprietary or closed devices to facilitate delivery of television signals or other service related signals to an endpoint at a subscriber location. A primary device may be included at the endpoint to interface the signals with the subscribers. It may be desirable to notify secondary devices of operation changes and other events taking place at the primary device, particularly if applications operating on those secondary device are related to the service being consumed through the primary device, e.g., an interactive application operating on the secondary device may be configured to facilitate product advertisement for a television program being supported through the primary device.

Configuring the primary device to provide the desired notifications to the secondary devices can be difficult, particularly if the primary device is proprietarily configured or has limited processing or communication capabilities. The present invention contemplates ameliorating this difficulty by relying on back channel communications, and/or more particularly, devices and capabilities of the supporting system operator to communicate desired notifications to the secondary devices.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
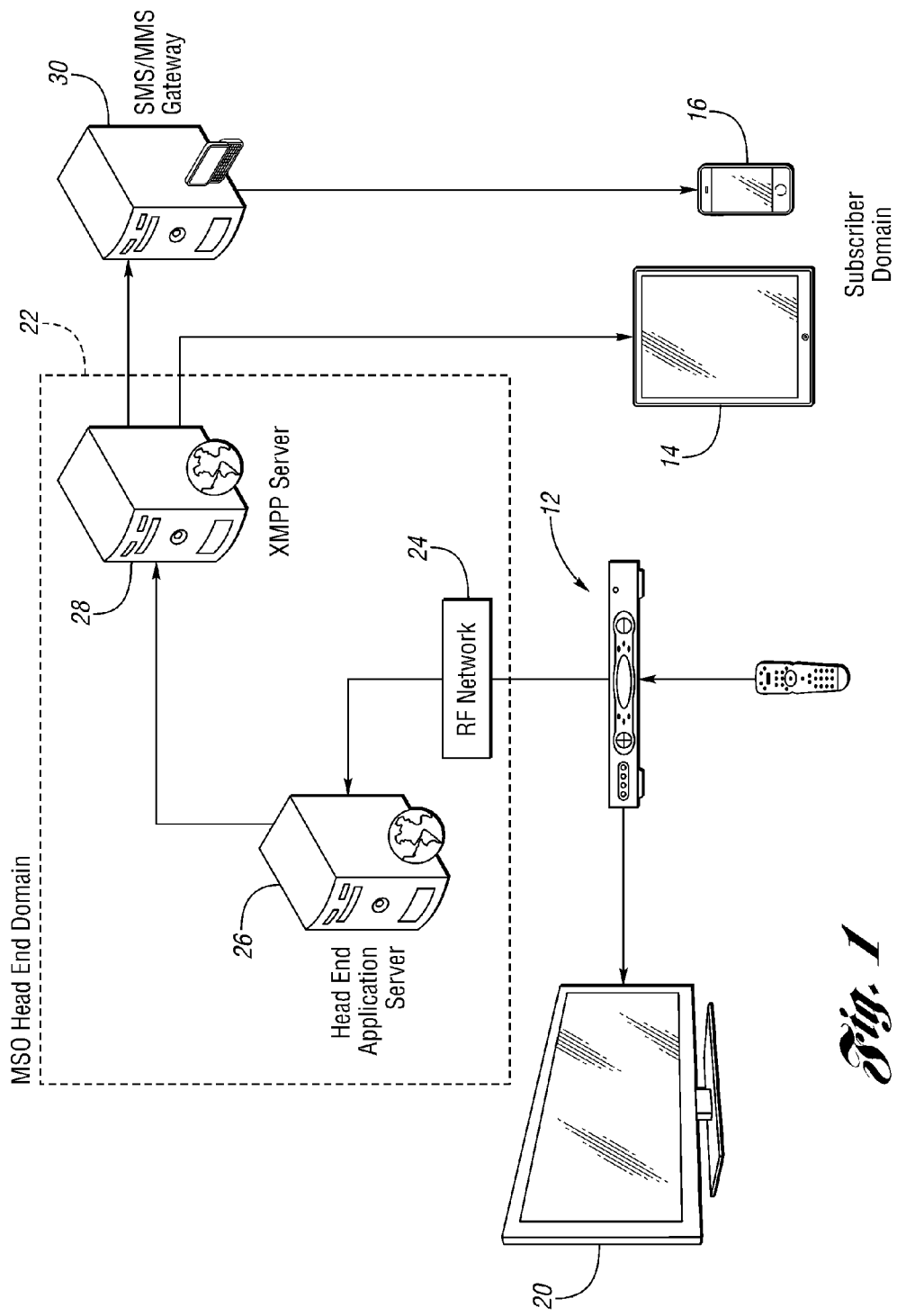
FIG. 1 illustrates a back channel communication system as contemplated by one non-limiting aspect of the present invention.

FIG. 1 illustrates a back channel communication system 10 as contemplated by one non-limiting aspect of the present invention. The back channel communication system 10 generally corresponds with a service provider facilitating messaging between a primary device 12 and one or more secondary devices 14, 16. The system 10 is predominately described with respect to the service provider being associated with a cable television service provider. This is done for exemplary non-limiting purposes as the present invention fully contemplates the service provider being any other type of service provider or multiple system operator (MSO), such as but not necessarily limited to a satellite television service provider, a cellular telephone service provider, a high-speed data service provider, an Internet service provider (ISP) and/or a voice over Internet protocol (VoIP) service provider. Accordingly, the present invention fully contemplates the illustrated system 10 being adapted or otherwise configured to facilitate its operation with these or other types of service providers.

The primary device 12 is shown to correspond with a set top box (STB) configured to facilitate interfacing television related signaling with a television or other suitable endpoint 20 at a subscriber location. The television signals output from the STB 12 may be controlled with a remote control or other type of interface through which a user input may be received. The STB 12 may be configured to provide an electronic programming guide (EPG) to facilitate selecting various television related services, such as but not necessary limited to facilitating viewing of a selected television channel, a video-on-demand (VOD) program, interactive television (ITV) application, interactive gaming application, etc. While the STB 12 and television 20 are illustrated, the present invention fully contemplates the primary device 12 being any type of device having capabilities to interface electronic signaling with a user and is only provided to demonstrate one exemplary aspect of the present invention as it applies with respect to supporting television related signaling. The primary device 12 may also include but is not necessary limited to a computer, a mobile phone, a personal digital assistant (PDA), a tablet computer, a media terminal adapter (MTA), a cellular phone, etc.

The service provider may include a headend 22 having a bi-directional RF network 24 (or modulator) configured to transmit and receive signals from the primary device 12. The bi-directional RF network 24 may be configured to inspect messages generated by the primary device 12 and receive a corresponding forwarding universal resource locator (URL) for packaging and sending through the RF network 24 or other suitable interface of the headend 22 to a headend application server 26 via a hyper-text transfer protocol (HTTP) post. The application server 26 may process the messages as described below in more detail to facilitate the back channel communications contemplated by the present invention.

The primary device 12 may be configured to automatically generate messages according to various operating states or upon occurrence of certain triggering events. The primary device 12 may include an application (not shown) stored within a computer-readable medium (not shown) having instructions which when executed with a processor facilitate interfacing various services with the user. The application may include instruction sufficient facilitate transmitting various messages in a manner contemplated by the present invention. One non-limiting aspect of the present invention contemplates the primary device 12 being configured to generate a change message when a change in operation occurs, such as in the event a user input is received through the remote control or other input means, e.g., upon occurrence of a channel change, selection of a VOD program, manipulation of an EPG, etc. It may be desirable to notify one or more of the secondary devices 14, 16 of the corresponding change in operation of the primary device 12. A notification message may be transmitted to notify the desired one or more of the secondary devices 14, 16 of the change in operation.

FIG. 1 illustrates an exemplary configuration where notification messages provided to a tablet computer 14 and a cellular phone 16. The notification messages are shown to be sourced from and Extensible Messaging and Presence Protocol (XMPP) server 28. A first notification message may be transmitted directly from the XMPP server 28 to the tablet computer 14 and a second notification message may be transmitted from the XMPP server 28 to a short message service (SMS)/multimedia message service (MMS) gateway 30 for processing prior to a corresponding message being transmitted to the cellular phone 16. The messages reaching the tablet 14 and the cellular phone 16 may be sufficient to apprise a user thereof of the change in operation. The secondary devices 14, 16 may optionally process the messages differently and/or according to various applications in order to interface the change in operation according to the limitations or other capabilities of the corresponding device 14, 16 and/or according to other output desires. The SMS/MMS gateway 30 may be beneficial in facilitating delivery of text messages or multimedia messages to the cellular phone 16 or other device having more limited processing capabilities than the tablet 14, i.e., a device that may not be able to process the notification message has natively formatted by the XMPP server.

The XMPP server 28 may be configured in accordance with XMPP specification RFC 6120, RFC 6121, and RFC 6122, the disclosures of which are hereby Incorporated by reference in its entirety. The XMPP server 28 may be configured to facilitate back channel messaging for any number of primary devices 12 and with any number of secondary devices 14, 16. In particular, the XMPP server 28 may be configured to register a plurality of secondary devices 14, 16 and to cross-reference each of the reference secondary devices 14, 16 with one or more primary devices 12 in order to facilitate the contemplated back channel signaling. (While only a single primary device 12 shown in FIG. 1, the present invention fully contemplates the headend 22 being configured to facilitate similar to channel signaling for any number of additional primary devices 12 with any number of secondary devices 14, 16.) The XMPP server 28 may include a registration application or authentication process to facilitate associating the secondary devices 14, 16 with one or more of the primary devices 12. This authentication process may be executed in cooperation with subscriber agreements or other authorizations provided from the subscriber associated with each primary device 12 and input or otherwise verified for use with the cross-referenced one or more of the secondary devices 14, 16.

The headend application server 26 may be configured to process the change messages and other messages transmitted from the primary device 12 into suitable XMPP messages. The XMPP messages may be communicated to the XMPP server 28 in order to apprise the XMPP server 28 of a change in operation of the primary device 12 or to provide other notification related details within messages transmitted to the headend application server 26. One non-limiting aspect of the present invention contemplates facilitating back channel signaling without having to specially configure the primary device 12 to identify the one or more secondary devices 14, 16 authorized to receive the notification message and/or without requiring the primary device 12 to provide addresses or other indicia of the authorized secondary devices 14, 16. The primary device 12 may be configured to include a unique identifier, such as a media access control (MAC) number, within the change messages or other messages transmitted to the head an application server 26. This unique identifier may be relayed to the XMPP server 28 to identify the authorized one or more of the plurality of secondary devices 14, 16.

The XMPP server 28 may include a look-a table or other medium for storing a relation between the primary device 12 and the secondary devices 14, 16 according to the unique identifier of the primary device 12. The XMPP server may require each secondary device 14, 16 desiring receipt of notification messages to complete an authentication process. The authentication process may be used to verify the one or more secondary devices 14, 16 that are currently active in order to ensure notification messages are only delivered to an active one or more of the secondary devices 14, 16 cross-referenced with the unique identifier of the primary device 12. The reliance on the XMPP server 28 to identify the one or more secondary devices 14, 16 authorized to receive notification messages may be beneficial in ameliorating the processing demands on the primary device 12, i.e., to provide the contemplated back channel communication. In this manner, the notification messages may be delivered through back channels to the authorized one or more of the secondary devices 14, 16 without the primary device 12 having to be aware of the activity of the secondary devices 14, 16, the addresses of the secondary devices 14, 16 to which the notification messages must be sent, and/or without having to directly communicate the notification messages thereto (e.g., the primary device 12 could be configured to transmit the notification message directly to the authorized one or more of the secondary devices 14, 16 over a Wi-Fi connection or other medium that bypasses the headend 22).

Figure 2:
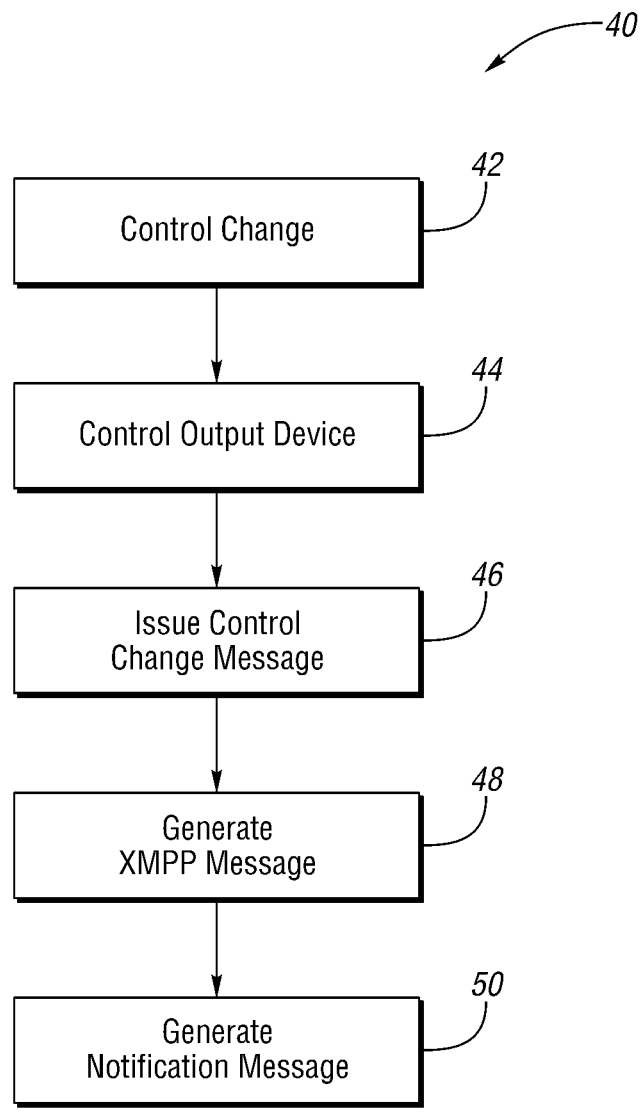
FIG. 2 illustrates a flowchart of a method for back channel communication as contemplated by one non-limiting aspect of the present invention.

FIG. 2 illustrates a flowchart 40 of a method for back channel communication as contemplated by one non-limiting aspect of the present invention. The method is predominately described with respect to providing television related information to one or more secondary devices in response to user interaction with a primary device, such as but not necessary limited to facilitating notifying a tablet and/or a cellular phone through back channel communications of operational changes in a STB. While method is described in this regard, the present invention is not necessarily so limited fully contemplates its use and application of facilitating other types of message notifications and is particularly not limited to providing television related information. The present invention is described with respect to providing television related information as it contemplates the STB being one type of device having limited communication capabilities, particularly in that it may lack sufficient capabilities to communicate directly with the secondary devices, i.e., it may need the back channel communication supported by the headend.

Block 42 relates to the primary device detecting a user input or other triggering event in response to which one or more secondary devices desire a notification. The notification is described as being delivering with a notification message; however, the present invention fully contemplates the notification being provided through other signaling means. The one or more secondary devices desiring notification may be required to register with a XMPP server or similar authorizing agent associated with a headend or other system being used to facilitate the contemplated back channel communications. As part of the authorization process, the one or more secondary devices may indicate the type of notifications which are desired so that notification messages can be delivered according to the particular desires of each authorized secondary device. Block 44 relates to the primary device executing the operation associated with the change in operation, e.g., changing a tuned to channel in response to user input of a new television channel.

Block 46 relates to the primary device issuing a control change message to the headend application server upon occurrence of one of the notification related triggering events. The control change message may include a description of the event and a unique identifier of the communicating primary device. The control change message may be issued from the primary device (e.g., a STB) according to its standard operation such that the messages are those typically issue from the device during its normal course of operation (e.g., the normal operations associated with facilitating user interaction with television related services). The control change message may be issued according to the GXP protocol used by a STB to report various changes in operation. Block 48 relates to the application server receiving the control change message generating and XMPP message. The XMPP message may be generated to facilitate indicating the nature of the change in operation and the unique identifier associated with the corresponding primary device. The data may be formatted within the XMPP message according to the XMPP processing requirements of XMPP server.

The XMPP server may rely upon the unique identifier provided by the primary device to facilitate cross-referencing with the second devices authorized to receive the related notification. This may include the XMPP server limiting the number of authorized secondary devices to which notification messages are transmitted depending on whether the corresponding secondary devices currently active. The XMPP server may rely on the change in operation information included within the XMPP message to facilitate specifying sufficient notification related information within the notification message, i.e., the XMPP server may format the notification message according to the particular requirements of the secondary device, or the application operating on the secondary device, as required to facilitate notifying the user of the corresponding change in operation of the primary device.

Block 50 relates to the XMPP server generating the notification message according to the requirements specified in the XMPP message issued from the headend application server. The XMPP server may transmit the corresponding one or more notification messages directly to the intended secondary devices and/or to a gateway, such as an SMS/MMS gateway, or other intermediary tasked with further processing the notification message before being delivered to one or more of the secondary devices. The ability to provide the notification message to the one or more secondary devices without requiring the primary device to be aware of the one or more secondary devices and/or to be aware of address of the secondary devices may be advantageous in ameliorating the operating demands on the primary device associated with facilitating the desired notification.

As noted above, various triggers, in addition to those associated with changes in operation of the primary device, may be used to designate events for which the notification messages are desired. The control change message or other suitable message issued from the primary device upon occurrence of the triggering event to facilitate delivery of the notification message may include those described below in more detail. The exemplary triggers described below provide an initial set of triggers and responses defined according to the Enhanced TV Binary Interchange Format (EBIF) code release versions I05, the disclosure of which is hereby incorporate by reference in its entirety. Modification to any of these triggers or responses may be achieved in the form of a new, removed, or modified parameter, a new trigger or response will be defined with a new tt-identifier or a new response type, and the new definition for that interface. In addition, the application major or minor number may be incremented (depending upon the change).

One type of triggering event may occur upon the primary device receiving a request to execute a particular operation. One request may relate to a trigChannel request. The trigChannel may be used to request the STB (primary device) to switch to a linear channel, defined by virtual channel number. When the channel selection completes, an asynchronous Media Changed notification (control change message) may be received by the headend application server.

One response format of the corresponding message generated by the STB after requesting execution of the trigChannel operation, i.e., the change control message sent to the headend application server, is shown below.

Versioning

The initial set of triggers and responses defined here map to the EBIF code release versions 1.1.x. If a modification to any of these triggers or responses in the form of a new, removed, or modified parameter, a new trigger or response will be defined with a new tt-identifier or a new response type, and the new definition for that interface. In addition, the application major or minor number will be incremented (depending upon the change).

Requests trigChannel trigChannel is used to request the set-top box to switch to a linear channel, defined by virtual channel number. When the channel selection completes, an asynchronous Media Changed notification will be received.

| Field | Type/Value | Description |
| --- | --- | --- |
| tt-identifier | 1 | Identifies this as trigChannel |
| requestId | uint16 | Globally increasing (per box) request ID |
| ackFlag | uint8 | 0 = no ack, 1 = always ack, 2 = ack on error Responses posted to the URL identified in trigStatus. If this URL is empty, no responses will be sent. |
| channel | uint16 | Virtual Channel Number to select |

Request Format

| Field | Type/Value | Description |
| --- | --- | --- |
| uid | string | Device MAC address as 12 character hex string |
| t | uint16 | Response type, set to 1 |
| r | uint16 | Request ID that this is a response to |
| e | uint8 | the EBIF application is "suspended" - result of a guide or menu screen was up, or the STB in Low Power Mode when this |

Note also that if a tuner conflict is detected (i.e. both tuners are busy recording), an error will be thrown asynchronously by the ETV UA. This error will be caught and sent as an unsolicited message (see below).

An example Response may take the form shown below.
"http://10.49.5.31:8080/etv/
?m=0000014ef128&t=1&r=2367&e=0"

trigStatus trigStatus is used to control the address where responses are posted and to request status information.

Request Format

| Field | Type/Value | Description |
| --- | --- | --- |
| tt-identifier | 2 | Identifies this as trigStatus |
| requestId | uint16 | Globally increasing (per box) request ID |
| ackFlag | uint8 | Always acks, regardless of the ack flag. Responses posted to the URL identified in trigStatus. If this URL is empty, no responses will be sent. |
| replyUrl | string | Base URL to send all responses and asynchronous |

-continued

| Field | Type/Value | Description |
|---|---|---|
| | | messages to. If set to NULL, no further responses or asynchronous messages will be sent until a subsequent trigStatus request which supplies a replyURL. |
| timeout | uint16 | Value in minutes that the application will stop sending unsolicited channel change and video state change messages. Must be 1 or greater (0 is invalid). |

Behavior of the Timeout Value:

Timer will start when the trigStatus message is received. Unsolicited and acknowledgement messages will check to see if the timer is still active to send messages. When the timer expires, return path messages will no longer be sent. If messages are stopped with the trigControl trigger, this timer will also be stopped. If messages are started again with trigControl, the timer will be reset and started.

The timer will be reset and restarted with every trigStatus message. The trigStatus and the trigControl triggers are the only triggers that will reset and restart the timer.

This applies to all return path messages, including unsolicited and acks. If a trigger comes in that requires an ack, the ack willonly be sentif the timer is still active and the ack flag is set. (There should not be a situation where a trigger arrives that requires an ack but the timer is not active, because if the IP client device is in an active session, it should send trigStatus messages periodically to keep the timer alive.) The replyUrl and the timer valuewill be persisted, so that if the application restarts, the timer will be restarted automatically to send messages. This will last for one timer cycle. If there is not an active IP client session, then the timer will expire and no more messages will be sent.

Upon expiration of the timer. the EBIF application will remove the URL and timer values from persistent memory, stop the timer and clear the replyUrl in the application.

Response Format

| Field | Type/Value | Description |
|---|---|---|
| uid | string | Device MAC address as 12 character hex string. |
| t | uint16 | Response type, set to 2. |
| r | uint16 | Request ID that this is a response to. |
| e | uint8 | Error code: 0 = no error, non-zero = message-specific error code |
| s | uint8 | Identifies the current source type: 1 = Live, 2 = DVR, 3 = VOD |
| c | uint16 | Current virtual channel for live mode, −1 for vod mode, or the last live channel if in DVR mode. |
| p | uint8 | PIN status: 0 = Purchase PIN is not set, 1 = Purchase PIN is set |
| v | string | reflects a version number that represents the EBIF app internal version |
| TBD | string | VOD provider. Only present for VOD source type. |
| a | string | VOD asset ID. Only present for VOD source type. |
| f | string | DVR recording ID. Only present for DVR source type |
| d | uint8 | Current play direction enum: * reserved = 0 forward play = 1 forward skip = 2 reverse play = 3 reverse skip = 4 reserved = 5 stop = 6 May be omitted to signify forward play. |
| TBD | uint8 | Current play velocity enum: * paused = 0 step = 1 slow = 2 normal = 3 fast1 = 4 fast2 = 5 fast3 = 6 fast4 = 7 fast5 = 8 May be omitted to signify normal. |
| l | int32 | Current media location (media time) expressed as milliseconds from the start of the program. May |

| Field | Type/Value | Description |
|---|---|---|
| | | be omitted if the content is live and presentation is at the live point. |

Example Responses http://10.49.5.31:8080/etv/?m=0000014ef128&t=2&r=73&e=0&s=1&c=114
http://10.49.5.31:8080/etv/?m=0000014ef128&t=2&r=74&e=0&s=2&c=116
http://10.49.5.31:8080/etv/?m=0000014ef128&t=2&r=75&e=0&s=3&c=−1 trigVod trigVod is used to request the playback of a VOD asset. When the VOD playback commences, an asynchronous Media Changed notification will be received. If an invalid providerid/assetid are provided, the VOD client will still attempt to load the asset, but when it fails, it will result in an asynchronous error (type 130) with an error code of 3. During the process of trying to launch the asset, there will also be a series of media change notifications (one to indicate going to vod, one to indicate going back to the channel).

Request Format

| Field | Type/Value | Description |
|---|---|---|
| tt-identifier | 3 | Identifies this as trigVod |
| requestId | uint16 | Globally increasing (per box) request ID |
| ackFlag | uint8 | 0 = no ack, 1 = always ack, 2 = ack on error. Responses posted to the URL identified in trigStatus. If this URL is empty, no responses will be sent. |
| providerId | string | The provider ID of the asset to play. |
| assetId | string | The asset ID of the asset to play. |
| launchDialog | uint8 | 0 = do not launch dialog (go straight to VOD asset), 1 = launch VOD dialog |
| purchasePin | uint16 | 0xFFFF is default value if PIN is not set, otherwise use value queried from user |

Response Format

| Field | Type/Value | Description |
|---|---|---|
| uid | string | Device MAC address as 12 character hex string |
| t | uint16 | Response type, set to 3 |
| r | uint16 | Request ID that this is a response to |
| e | uint8 | Error code: 0 = no error. Note that this does not signify that the VOD asset has commenced playback, merely whether the request was initiated successfully. 0 = no error 1 = PIN incorrect 2 = the EBIF application is "suspended" - result of a guide or menu screen was up, or the STB in Low Power Mode when this request was made |

Example Responses http://10.49.5.31:8080/etv/?m=0000014ef128&t=3&r=2367&e=0
http://10.49.5.31:8080/etv/?m=0000014ef128&t=3&r=2368&e=1 trigVideoControl trigVideoControl is used to provide trick-mode control for VOD playback on VOD sessions that were initiated by the EBIF application. (Note this is a limitation of the TVWorks user agent—but it may also be a similar limitation on other user agents as well.)

Request Format

| Field | Type/Value | Description |
| --- | --- | --- |
| tt-identifier | 4 | Identifies this as trigVideoControl |
| requestId | uint16 | Globally increasing (per box) request ID |
| ackFlag | uint8 | 0 = no ack, 1 = always ack, 2 = ack on error. Responses posted to the URL identified in trigStatus. |
| rate | int8 | Current play velocity. The following values will be supported:<br>−2 = rewind at −2x (only rewind option available in the VOD client)<br>0 = pause<br>1 = play normal<br>2 = play forward at 2x (only fast forward option available in the VOD client) |
| startNpt | signed int32 | The number in milliseconds from the start of media playtime to play back the video. −1 indicates this value should be ignored. 0 indicates the beginning of the video. Any positive value greater than 1 will be used. If the value is greater than the end of the media timeline, the behavior is platform-dependent. |
| endNpt | signed int32 | The number in milliseconds from the start of media playtime to stop playback of the video. −1 indicates this value should be ignored. A valid value must be greater than startNpt. Only applies when video mode is forward, play rate is normal. |

Response Format

| Field | Type/Value | Description |
| --- | --- | --- |
| uid | string | Device MAC address as 12 character hex string. |
| t | uint16 | Response type, set to 4. |
| r | uint16 | Request ID that this is a response to. |
| e | uint8 | Error code: 0 = no error, 1 = unsupported play rate requested |

NOTE:
It is possible to disable trick mode on an asset in a VOD server. However, the ETV User Agent has no way of knowing if trick mode is disabled. This was tested in two environments, one with a Seachange VOD server and client (on the STB), the other a Tandberg Ericsson OpenStream VOD server and client. In the Seachange environment, if a trick mode command is attempted from within ETV, it stops the on-demand playback and tears down the VOD session. In the Tandberg environment, even though trick mode is disabled if attempted through the remote control (i.e. the VOD client prohibits trick mode), trick mode still works from the ETV application.

It is recommended that. the support of trick mode be indicated in the metadata provided to the iPad app, and the ability to perform trick mode is handled at the iPad app, since it is difficult to gracefully handle it from within ETV.

Example Responses http://10.49.5.31:8080/etv/?m=0000014ef128&t=4&r=23&e=0
http://10.49.5.31:8080/etv/?m=0000014ef128&t=4&r=24&e=1 trigVideoStop trigVideoStop is used to stop the current video source (currently only applies to VOD that has been started by the app)

Request Format

| Field | Type/Value | Description |
| --- | --- | --- |
| tt-identifier | 5 | Identifies this as trigVideoStop |
| requestId | uint16 | Globally increasing (per box) request ID |
| ackFlag | uint8 | 0 = no ack, 1 = always ack, 2 = ack on error. Responses posted to the URL identified in trigStatus. |

Response Format

| Field | Type/Value | Description |
| --- | --- | --- |
| uid | string | Device MAC address as 12 character hex string. |
| t | uint16 | Response type, set to 5. |
| r | uint16 | Request ID that this is a response to. |
| e | uint8 | Error code: 0 = no error, non-zero = message-specific error code |

Example Response http://10.49.5.31:8080/etv/?m=0000014ef128&t=5&r=23&e=0

Note: It appears that the TV Works 3.4.1 user agent sends out the following responses to a trigVideoStop:

1. Ack response (shown in this section)

2. Media Change notification with s=3 and c=−1 (indicating VOD)

3. Video Rate Change notification with d=6 and r=0 (to indicate the stop)

4. Media Change notification with s=1 and c=current live channel (when the video stops it goes back to the last live channel)

trigRecord trigRecord is used to schedule the recording of an individual program, or of a series.

Request Format

| Field | Type/Value | Description |
| --- | --- | --- |
| tt-identifier | 6 | Identifies this as trigRecord |
| requestId | uint16 | Globally increasing (per box) request ID |
| ackFlag | uint8 | uint8 |
| channel | uint16 | Virtual Channel Number to select. This is required for series recording, even though series can be recorded on other channels as well. |
| startTime | uint32 | The program start time in UNIX format, converted to GMT time zone. 0 will mean start recording immediately. For series recording, this must be the timestamp of the first instance of the series to be recorded. |
| seriesId | uint32 | Series identifier for the recording. Zero if this is a single recording. |
| seriesOption | uint8 | (enum: new episodes = 0, new episodes and repeats, all including dups). |
| saveOption | uint8 | (enum: save until space needed = 0, save until user deletes) |
| startAdjust | uint8 | Number of minutes early to start recording. Applies to both timed and series recordings. Valid |

| Field | Type/Value | Description |
| --- | --- | --- |
| endAdjust | uint8 | values: 0-15<br>Number of extra minutes to record following the scheduled end time of the program. Applies to both timed and series recordings. Valid values: 1-10, 15, 30, 60, 90, 120 |

Notes: I am using http://www.4webhelp.net/us/timestamp-.php to get the Unix timestamp at GMT. I take the time I want, add 6 hours (since we are GMT −6), and enter it in the website for conversion. The startTime does not need to align exactly with the programmed start time. If the program starts at 5:00 PM, and I send a request before 5:00 PM to start recording at 5:15 PM, the entire program will be recorded starting at 5:00 PM.

Response Format

| Field | Type/Value | Description |
| --- | --- | --- |
| uid | string | Device MAC address as 12 character hex string |
| t | uint16 | Response type, set to 6 |
| r | uint16 | Request ID that this is a response to |
| e | uint8 | Error code (see details below) |

Error Codes:
0=No Error
1=Recording failed (most likely due to a tuner conflict, but there is no real visibility beyond just a failure—I have reproduced this failure when trying to set up a series recording while the guide is onscreen)
2=Recording was already set—note this condition can only be detected when the timestamp provided is the exact start time of the program being recorded (if it is 5 minutes into the program or if 0 is provided for startTime it will not detect if the recording is set—this is a limitation of the user agent.)
3=the EBIF application is "suspended"—result of a guide or menu screen was up, or the STB in Low Power Mode when this request was made Example Responses http://10.49.5.31:8080/etv/?m=0000014ef128&t=6&r=23&e=0
http://10.49.5.31:8080/etv/?m=0000014ef128&t=6&r=25&e=1
http://10.49.5.31:8080/etv/?m=0000014ef128&t=6&r=26&e=2 trigDisplay trigDisplay is used to request the set-top box display a supplied string, or to dismiss a prior display.

Request Format

| Field | Type/Value | Description |
| --- | --- | --- |
| tt-identifier | 7 | Identifies this as trigDisplay |
| requestId | uint16 | Globally increasing (per box) request ID |
| ackFlag | uint8 | 0 = no ack, 1 = always ack, 2 = ack on error. Responses posted to the URL identified in trigStatus. If this URL is empty, no responses will be sent. |
| display | string | String to display. If empty, dismisses any prior displayed string. |
| timeout | uint8 | Number of seconds to leave dialog on screen |

Response Format

| Field | Type/Value | Description |
| --- | --- | --- |
| uid | string | Device MAC address as 12 character hex string |
| t | uint16 | Response type, set to 7 |
| r | uint16 | Request ID that this is a response to |
| e | uint8 | Error code: 0 = no error, 1 = The STB is in Low Power Mode |

Example Responses http://10.49.5.31:8080/etv/?m=0000014ef128&t=6&r=2367&e=0 trigPurchasePin trigPurchasePin is used to find out if the purchase PIN has been set on the STB.

Request Format

| Field | Type/Value | Description |
| --- | --- | --- |
| tt-identifier | 8 | Identifies this as trigPurchasePin |
| requestId | uint16 | Globally increasing (per box) request ID |
| ackFlag | uint8 | Always sends a response, regardless of ack flag Responses posted to the URL identified in trigStatus. If this URL is empty, no responses will be sent. |

Response Format

| Field | Type/Value | Description |
| --- | --- | --- |
| uid | string | Device MAC address as 12 character hex string |
| t | uint16 | Response type, set to 8 |
| r | uint16 | Request ID that this is a response to |
| e | uint8 | Error code: 0 = no error, non-zero = message-specific error code |
| p | uint8 | PIN status: 0 = Purchase PIN is not set, 1 = Purchase PIN is set |

Example Responses

"http://10.49.5.31:8080/etv/?m=0000014ef128&t=6&r=33&e=0&p=1"
http://10.49.5.31:8080/etv/?m=0000014ef128&t=6&r=34&e=0&p=0 trigControl trigControl is a trigger that should be used internally more for debug and control messages. Initially this will be used to enable/disable notifications, debug displays, and even provide a way to terminate the app through a trigger. This trigger should not be used for messages that are initiated from the IP remote device.

Request Format

| Field | Type/Value | Description |
|---|---|---|
| tt-identifier | 9 | Identifies this as trigControl |
| requestId | uint16 | Globally increasing (per box) request ID |
| ackFlag | uint8 | 0 = no ack, 1 = always ack, 2 = ack on error. Responses posted to the URL identified in trigStatus. If this URL is empty, no responses will be sent. |
| command | uint8 | 0 = disable notification, 1 = enable notification, 2 = debug display |
| argument | uint32 | For commands 0 and 1, this will map to the notification to control (i.e. 128, 129 or 130), for command 2, this will map to 0 = hide the debug display, and nonzero = show the debug display. |

Response Format

| Field | Type/Value | Description |
|---|---|---|
| uid | string | Device MAC address as 12 character hex string |
| t | uint16 | Response type, set to 9 |
| r | uint16 | Request ID that this is a response to |
| e | uint8 | Error code: 0 = no error, non-zero = message-specific error code |

Example Responses

"http://10.49.5.31:8080/etv/?m=0000014ef128&t=1&r=54&e=0"

trigTerminate trigTerminate is a trigger that should be used internally only for killing the app. It should automatically reload within the httpInterval configuration (30-60 seconds in the current lab config), or can be reloaded by pressing menu-ITV button. This is just for field trial deployment and should not be exposed in the iPad app.

NOTE: This trigger is accessible via the RESTFUL interface using the same API as the one to access trigControl, even though the interface to the STB is a separate trigger. We had to create a separate trigger, as we determined calling terminate from the trigControl handler can reset the STB. To access trigTerminate via the RESTFUL API, use the url: POST http://cortex:8080/ipr/services/accountservice/devices/100653/control?command=999&value=0.

Request Format

| Field | Type/Value | Description |
|---|---|---|
| tt-identifier | 999 | Identifies this as trigTerminate |
| requestId | uint16 | Globally increasing (per box) request ID |

There is no response sent for this trigger, as the app is immediately terminated upon receipt of this trigger.

Asynchronous/UnsolicitedNotifications Media Changed Notification

Notification Format

| Field | Type/Value | Description |
|---|---|---|
| uid | string | Device MAC address as 12 character hex string. |
| t | uint16 | Notification type, set to 128. |
| s | uint8 | Identifies the current source type: 1 = Live, 2 = DVR, 3 = VOD |
| c | uint16 | Current virtual channel. Will be −1 for VOD or DVR source types. |
| p | string | VOD provider/asset id. In the form of a locator, i.e. vod://tvworks.com/TAM11456898723 |
| f | string | DVR recording ID. Only present for DVR source type |

Example Notifications http://10.49.5.31:8080/etv/?m=0000014ef128&t=128&s=1&c=114 (from tuning to a live channel, or after a DVR playback or VOD session stops)

http://10.49.5.31:8080/etv/?m=0000014ef128&t=128&s=2&c=125 (last live channel before starting a DVR playback)

http://10.49.5.31:8080/etv/?m=0000014ef128&t=128&s=3&c=−1 (when a VOD session has started)

Note the Media Changed Notification can be turned off by sending a control message, with command=0 and argument=128. This value defaults to on (messages will be sent): Once the value is configured, that value will be persisted over application restarts and power cycles of the STB.

Video State Changed Notification

Notification Format (Note these are the form that are provided by the TVWorks ETV User agent. The middleman server will convert these to values that align with the "playRate" parameters used in the video control interface.)

| Field | Type/Value | Description |
|---|---|---|
| uid | string | Device MAC address as 12 character hex string. |
| t | uint16 | Notification type, set to 129. |
| d | uint8 | mode: play-forward = 1 play-reverse = 3 skip-forward = 2 skip-reverse = 4 stop = 6 |
| r | uint8 | rate: pause = 0 step = 1 slow = 2 normal = 3 fast1 = 4 |

Example Notifications

"http://10.49.5.31:8080/etv/?m=0000014ef128&t=129&d=1&r=3" play is normal

"http://10.49.5.31:8080/etv/?m=0000014ef128&t=129&d=3&r=4" rewind at 2× speed

"http://10.49.5.31:8080/etv/?m=0000014ef128&t=129&d=1&r=4" fast forward at 2× speed "http://10.49.5.31:8080/etv/?m=0000014ef128&t=129&d=6&r=0" video playback has stopped Note the Video State Changed Notification can be turned off by sending a control message, with command=0 and argument=129. This value defaults to off (messages will NOT be sent). Once the value is configured, that value will be persisted over application restarts and power cycles of the STB.

Asynchronous Error Detected

Notification Format

| Field | Type/Value | Description |
|---|---|---|
| uid | string | Device MAC address as 12 character hex string. |
| t | uint16 | Notification type, set to 130. |

| Field | Type/Value | Description |
|---|---|---|
| e | uint8 | Error Code: 1 = Unknown Error, 2 = Tuner Conflict, 3 = VOD Asset Load Error |

Example Notifications http://10.49.5.31:8080/etv/?m=0000014ef128&t=130&e=1"

EBIF Trigger Format in Message Requests

When a message request includes one or more string parameters, these not passed as offsets into the "heap" that is at the end of the EBIF trigger payload that contains the actual string data.

For example, the trigVod trigger message contains two strings, the provider ID and the asset ID, following by a one-byte boolean (launchDialog). Each string is represented by a 16-bit integer, which is the offset into the heap that starts immediately after the last parameter (in this case, right after the launchDialog byte). It will always be the case that the offset for the first string parameter will always be zero; the offset for the next string parameter will be (the length of the first string, plus 2 bytes for the length descriptor at the start of the first string).

Abridged Trigger Format

Here is an example of an abridged trigVod trigger with a providerId of "foo", an assetId of "bar", launchDialog flag set to false, and a purchase PIN of '1234' (0x04D2 in hex):

| Trigger Header (length = 10) | | |
|---|---|---|
| descriptor_tag | 0xA2 | |
| descriptor_length (e.g 30) | 0x00 | 0x1E |
| total message length starting with descriptor_tag | | |
| org_id | 0x36 | |
| app_id | 0x00 | 0x0F |
| tt_id (trigVod == 3) | 0x00 | 0x03 |
| payload_length (e.g 20) | 0x00 | 0x14 |
| length of payload following (starting after payload_length) | | |
| Trigger Payload | | |
| request_id | 0x12 | 0x34 |
| ack_flag | 0x01 | |
| heap offset of vodProvider | 0x00 | 0x00 |
| heap offset of vodAsset | 0x00 | 0x05 |
| launchDialog | 0x00 | |
| purchase_pin | 0x04 | 0xD2 |

| heap | | | |
|---|---|---|---|
| providerId (len) | 0x00 | 0x03 | |
| providerId (string) | 'f' | 'o' | 'o' |
| assetId (len) | 0x00 | 0x03 | |
| assetId (string) | 'b' | 'a' | 'r' |

Full Trigger Format

A full trigger format uses tables as defined in the EBIF AM Specification. Since we are targeting an I05 EBIF user agent, this table will use the I05 Constructs. The Trigger Payload is the same as the abridged format. The main difference is the header and a CRC at the end. Note this is 22 bytes longer than the abridged trigger format.

EISS Section (Table 5 in I05 AM Spec)

| Field | Bits | Example Value | Comment |
|---|---|---|---|
| table_id | 8 | 0xE0 | This is E0 for the I05 AM EISS Table |
| section_syntax_indicator | 1 | 0 | 1 bit that must be 0 |
| reserved | 3 | all 0 | |
| section_length | 12 | length value | Will be total size of the trigger = 3 bytes |
| reserved2 | 0 | 0x00 | |
| section_number | 8 | 0x00 | Will be zero for these types of triggers |
| last_section_number | 8 | 0x00 | Will be zero |
| protocol_version_major | 8 | 0x03 | Must be 3 for the I05 AM protocol |
| protocol_version_minor | 8 | 0x00 | Must be 0 |
| application_type | 16 | 0x0008 | Must be 8 to identity EBIF |
| application_identifier | 48 | 0x00 00 10 00 00 0F | 4 byte orgid 0x1000 for CableLabs and 2 byte app id 0x0t |
| platform_id_length | 8 | 0 | Will be zero for these types of triggers |

ETV Stream Event Descriptor

| Field | Bits | Example Value | Comment |
|---|---|---|---|
| descriptor_tag | 8 | 0xE2 | Must be E2 for I05 AM ETV Stream Event Descriptor |
| reserved | 4 | all 0 | |
| descriptor_length | 12 | length value | Number of bytes remaining in the trigger not including the CR |
| time_value | 32 | 0x00 00 00 00 | We will always set this to 0 |

Trigger Payload - same as abridgedtrigger

| Field | Bits | Example Value | Comment |
|---|---|---|---|
| tt_id | 16 | 0x00 03 | Example for trigVod tt_id = 3 |
| payload_length | 16 | 00x00 12 | Number of bytes remaining in the trigger not including the CRC |

Trigger Payload Example

| | | |
|---|---|---|
| request_id | 0x12 | 0x34 |
| ack_flag | 0x01 | |
| heap offset of vodProvider | 0x00 | 0x00 |
| heap offset of vodAsset | 0x00 | 0x05 |
| launchDialog | 0x00 | |
| heap | | |
| providerId (len) | 0x00 | 0x03 |
| providerId (string) | f | o | o |

| Then tidy it all up with a CRC-32! | | | |
|---|---|---|---|
| Field | Bits | Example Value | Comment |
| CRC_32 | 32 | whatever this would equate to | This is new in the full trigger and is not in the abridged trigger | accountservice/devices: Get List of Available Devices

| | |
|---|---|
| HTTP REQUEST | GET http://ips-sandbox1:8080/ipr/services/accountservice/devices |
| HTTP RESPONSE | HTTP/1.1 200 OK <?xml version="1.0" encoding="UTF-8" standalone="yes"?><Devices> <Device id="21950732" accountId="901234567" friendlyName="Dev 653" manufacturer="Pace" model="RNG200N" currentSource="service://vcn/235"/> <Device id="39335791" accountId="901234567" friendlyName="Dev 654" manufacturer="Pace" model="RNG200N" currentSource="service://vcn/123"/> <Device id="21950793" accountId="901234567" friendlyName="Dev 655" manufacturer="Pace" model="RNG200N" currentSource="vod://starzencore.com/titl2009012900190151"/> <Device id="363326545" accountId="901234567" friendlyName="Dev 513" manufacturer="Motorola" model="DCT6412" currentSource="service://vcn/235"/> </Devices> | accountservice/devices/{id}: Query a Single Device

| | |
|---|---|
| HTTP REQUEST | GET http://ips-\sandbox1:8080/ipr/services/accountservice/devices/21950793 |
| HTTP RESPONSE | HTTP/1.1 200 OK <?xml version="1.0" encoding="UTF-8" standalone="yes"?><Device id="21950793" accountId="901234567" friendlyName="Dev 653" manufacturer="Pace" model="RNG200N" currentSource="service://vcn/235"/> | accountservice/devices/{id}/status: Get a Device's Status

| | |
|---|---|
| HTTP REQUEST | GET http://ips-sandbox1:8080/ipr/services/accountservice/devices/21950793/status |
| HTTP RESPONSE | HTTP/1.1 200 OK <?xml version="1.0" encoding="UTF-8" standalone="yes"?><Device id="21950793" accountId="901234567" friendlyName="Dev 653" manufacturer="Pace" model="RNG200N" currentSource="service://vcn/235"/> |
| XMPP MESSAGE | <message id="v25p5-237" to="0000014ef128@ipr.cortex"> <subject>StatusResponse</subject> <body> </body> <properties xmlns="http://www.jivesoftware.com/xmlns/xmpp/properties"> <property><name>sourceType</name><value type="string">service</value></property> <property><name>ts</name><value type="string">1336763586552</value></property> <property><name>vcn</name><value type="string">276 </value></property> <property><name>errorCode</name><value type="string">0</value></property> <property><name>bPurchasePinSet</name><value type="string">1</value></property> <property><name>type</name><value type="string">StatusResponse</value></property> <property><name>deviceId</name><value type="string">100660</value></property> <property><name>etvAppVersion</name><value type="string">1.1.126</value></property> </properties> </message> | accountservice/devices/{id}/display: Display Message On Device

| | |
|---|---|
| HTTP REQUEST | POST http://ips-sandbox1:8080/ipr/services/accountservice/devices/21950793/display?message="Hello, world" |
| HTTP RESPONSE | HTTP/1.1 200 OK <?xml version="1.0" encoding="UTF-8" standalone="yes"?> <Device id="21950793" accountId="901234567" friendlyName="Dev 653" manufacturer="Pace" model="RNG200N" currentSource="service://vcn/235"/> |
| XMPP MESSAGE | <message id="7uTm7-210" to="test_group_1@ipr.ips-sandbox1"> <subject>DisplayResponse</subject> <body> </body> <properties xmlns="http://www.jivesoftware.com/xmlns/xmpp/properties"> <property><name>type</name><value type="string">DisplayResponse</value></property> <property><name>ts</name><value type="string">1336687233101</value></property> <property><name>errorCode</name><value type="string">0</value></property></properties> | accountservice/devices/{id}?currentSource: Change The Source To A Live Channel

| | |
|---|---|
| HTTP REQUEST | PUT http://ips-sandbox1:8080/ipr/services/accountservice/devices/21950793?currentSource=service://vcn/126 |
| HTTP RESPONSE | HTTP/1.1 200 OK <?xml version="1.0" encoding="UTF-8" standalone="yes"?> <Device id="21950793" accountId="901234567" friendlyName="Dev 653" manufacturer="Pace" model="RNG200N" currentSource="service://vcn/235"/> |
| XMPP MESSAGE | <message id="v25p5-201" to="0000cab1e001@ipr.cortex"> <subject>ChannelResponse</subject> <body> </body> <properties xmlns="http://www.jivesoftware.com/xmlns/xmpp/properties"> <property><name>ts</name><value type="string">1336687233101</value></property> <property><name>errorCode</name><value type="string">0</value></property> <property><name>type</name><value type="string">ChannelResponse</value></property> <property><name>deviceId</name><value type="string">1001</value></property> </properties> </message> |
| XMPP MESSAGE | <message id="v25p5-202" to="0000cab1e001@ipr.cortex"> <subject>MediaChangedNotification</subject> <body> </body> <properties xmlns="http://www.jivesoftware.com/xmlns/xmpp/properties"> <property><name>sourceType</name><value type="string">service</value></property> <property><name>ts</name><value type="string">1336687233207</value></property> |

```
                        <property><name>vcn</name><value type=
                        "string">102</value></property>
                        <property><name>type</name><value type=
                        "string">MediaChangedNotification</value></property>
                        <property><name>deviceId</name><value type=
                        "string">1001</value><property>
                        </properties>
                        </message>
``` accountservice/devices/{id}?currentSource: Change The Source To A VOD Asset

| | |
|---|---|
| HTTP REQUEST | PUT http://ips-sandbox1:8080/ipr/services/accountservice/devices/21950793?currentSource=vod://starzencore.com/titl2009010100187693 |
| HTTP RESPONSE | HTTP/1.1 200 OK <?xml version="1.0" encoding="UTF-8" standalone="yes"?> <Device id="21950793" accountId="901234567" friendlyName="Dev 653" manufacturer="Pace" model="RNG200N" currentSource="service://vcn/235"/> |

```
XMPP            <message id="7uTm7-213" to=
MESSAGE         "test_group_1@ipr.ips-sandbox1">
                <subject>VodResponse</subject>
                <body> </body>
                <properties xmlns="http://www.jivesoftware.com/xmlns/
                xmpp/properties">
                <property><name>type</name><value type=
                "string">VodResponse</value></property>
                <property><name>ts</name><value type=
                "string">1336687233101</value></property>
                <property><name>errorCode</name><value type=
                "string">0</value></property>
                </properties>
                </message>
```

```
XMPP            <message id="7uTm7-214" to=
MESSAGE         "test_group_1@ipr.ips-sandbox1">
                <subject>MediaChangedNotification</subject>
                <body> </body>
                <properties xmlns="http://www.jivesoftware.com/xmlns/
                xmpp/properties">
                <property><name>type</name><value type=
                "string">MediaChangedNotification</value></property>
                <property><name>ts</name><value type=
                "string">1336687233101</value></property>
                <property><name>sourceType</name><value type=
                "string">vod</value></property>
                <property><name>providerId</name><value type=
                "string">starzencore.com</value></property>
                <property><name>assetId</name><value type=
                "string">titl2009010100187693</value></property>
                </properties>
                </message>
``` accountservice/devices/{id}/control: Diagnostic control of the device

| | |
|---|---|
| HTTP REQUEST | POST http://ips-sandbox1:8080/ipr/services/accountservice/devices/21950793/control?command=2&value=1 |
| HTTP RESPONSE | HTTP/1.1 200 OK <?xml version="1.0" encoding="UTF-8" standalone="yes"?> <Device id="21950793" accountId="901234567" friendlyName="Dev 653" manufacturer="Pace" model="RNG200N" currentSource="service://vcn/235"/> |

```
XMPP            <message id="7uTm7-210" to=
MESSAGE         "test_group_1@ipr.ips-sandbox1">
                <subject>DisplayResponse</subject>
                <body> </body>
                <properties xmlns="http://www.jivesoftware.com/xmlns/
                xmpp/properties">
                <property><name>type</name><value type=
                "string">DisplayResponse</value></property>
                <property><name>ts</name><value type=
                "string">1336687233101</value></property>
                <property><name>errorCode</name><value type=
                "string">0</value></property>
                </properties>
                </message>
``` asynchronous MediaChanged notification

```
XMPP            <message id="v25p5-202" to=
MESSAGE         "0000cab1e001@ipr.cortex">
                <subject>MediaChangedNotification</subject>
                <body> </body>
                <properties xmlns="http://www.jivesoftware.com/xmlns/
                xmpp/properties">
                <property><name>sourceType</name><value type=
                "string">service</value></property>
                <property><name>ts</name><value type=
                "string">1336687233207</value></property>
                <property><name>vcn</name><value type=
                "string">102</value></property>
                <property><name>type</name><value type=
                "string">MediaChangedNotification</value></property>
                <property><name>deviceId</name><value type=
                "string">1001</value></property>
                </properties>
                </message>
``` asynchronous VideoStateChanged notification

```
XMPP            <message id="7uTm7-216" to=
MESSAGE         "test_group_1@ipr.ips-sandbox1">
                <subject>VideoStateChangedNotification</subject>
                <body> </body>
                <properties xmlns="http://www.jivesoftware.com/xmlns/
                xmpp/properties">
                <property><name>type</name><value type=
                "string">VideoStateChangedNotification</value>
                </property>
                <property><name>ts</name><value type=
                "string">1336687233101</value></property>
                <property><name>mode</name><value type=
                "string">1</value></property>
                <property><name>rate</name><value type=
                "string">2</value></property>
                </properties>
                </messages>
``` asynchronous AsynchronousError notification

```
XMPP            <message id="7uTm7-217" to=
MESSAGE         "test_group_1@ipr.ips-sandbox1">
                <subject>AsyncynchronousErrorNotification</subject>
                <body> </body>
                <properties xmlns="http://www.jivesoftware.com/xmlns/
                xmpp/properties">
                <property><name>type</name><value type=
                "string">AsynchronousErrorNotification</value>
                </property>
                <property><name>ts</name><value type=
```

-continued

```
"string">1336687233101 </value></property>
<property><name>errorCode</name><value type=
"string">1</value></property>
</properties>
</message>
```

Introduction

Messages from the STB intended for the iPad app are packaged inside an XMPP <message>. Specifically, the STB message is encapsulated within the <properties> section of the XMPP <message>.

```
<message id="7uTm7-210" to="test_group_1@ipr.ips-sandbox1">
<subject>StatusResponse</subject> <body>
</body> <properties xmlns="http://www.jivesoftware.com/xmlns/
xmpp/properties">
<property><name>type</name><value type="string">StatusResponse
</value></property>
    <property><name>sourceType</name><value
    type="string">service</value></property>
  <property><name>vcn</name><value type="string">132</value>
  </property>
  <property><name>errorCode</name><value type="string">0</
  value></property>
</properties> </message>
```

<properties>

The <properties> element contains an unordered collection of properties. Each property is the form: <property><name>foo</name><value type="string">bar</value></property> A property is a name/value pair; it contains one <name> element and one <value> element.

<subject>

For convenience, the <subject> element is set to the message type, the same that is in the <property> named "type". Do not rely on the contents of the <subject> element in your code; always rely on the actual properties themselves.

<body>

The <body> element may be set to some descriptive text that is intended to aid in development and debugging when using an IM client to monitor the XMPP traffic. The format and contents of the <body> element are entirely arbitrary and capricious and subject to change, so do not at any time rely or make assumptions about the contents of this element.

Responses

StatusResponse current source is a "service" (live channel) and returns the vcn (virtual channel number)

| <name> | <value> |
|---|---|
| type | StatusResponse |
| sourceType | service |
| vcn | 132 |
| errorCode | 0 | current source is a VOD asset and returns the provider and asset IDs

| <name> | <value> |
|---|---|
| type | StatusResponse |
| sourceType | vod |
| errorCode | 0 |

Currently, the TV Works user agent should, but does not, provide the following information:

| | |
|---|---|
| providerId | starzencore.com |
| assetId | titl2009010100187693 |

ChannelResponse

| <name> | <value> |
|---|---|
| type | ChannelResponse |
| errorCode | 0 |

VodResponse

| <name> | <value> |
|---|---|
| type | VodResponse |
| errorCode | 0 |

VideoControlResponse

| <name> | <value> |
|---|---|
| type | VideoControlResponse |
| errorCode | 0 |

VideoStopResponse

| <name> | <value> |
|---|---|
| type | VideoStopResponse |
| errorCode | 0 |

RecordResponse

| <name> | <value> |
|---|---|
| type | RecordResponse |
| errorCode | 0 |

DisplayResponse

| <name> | <value> |
|---|---|
| type | DisplayResponse |
| errorCode | 0 |

ControlResponse

| <name> | <value> |
|---|---|
| type | ControlResponse |
| errorCode | 0 |

PurchasePinResponse

| <name> | <value> |
|---|---|
| type | PurchasePinResponse |

-continued

| <name> | <value> |
|---|---|
| errorCode | 0 |

Asynchronous Notifications

MediaChangedNotification source has been changed to a "service" (live channel) and includes the vcn (virtual channel number)

| <name> | <value> |
|---|---|
| type | MediaChangedNotification |
| sourceType | service |
| vcn | 132 | source has been changed to a VOD asset and includes the provider and asset IDs

| <name> | <value> |
|---|---|
| type | MediaChangedNotification |
| sourceType | vod |
| vcn | 0 |

Currently, the TVWorks user agent should, but does not, provide the following information:

| | |
|---|---|
| providerId | starzencore.com |
| assetId | titl2009010100187693 |

VideoStateChangedNotification

| <name> | <value> |
|---|---|
| type | VideoStateChangedNotifcation |
| mode | 1, 2, 3, 4, or 6 |
| rate | 0, 1, 2, 3, 4 |

AsynchronousErrorNotification

| <name> | <value> |
|---|---|
| type | AsynchronousErrorNotification |
| errorCode | 0, or whatever |

As supported above, one non-limiting aspect of the present invention contemplates XMPP Back Channel Communication that has an asynchronous architecture sufficient to provide a scalable solution to send lightweight messages from a Cable operator's headend or other servicing point of a service provider to a large number of IP devices over the Internet or other convenient communication medium. This provides a highly scalable solution that allows an asynchronous message from a Set Top Box (STB) to discover what IP devices are connected to the system. This architecture may allow operators to easily scale multiple IP devices to interact with subscriber cable equipment (or other primary and/or secondary devices), such as to facilitate building additional services through social networking to provide cross/up selling promotions.

Optionally, the present invention may rely upon "long polling" as a discovery mechanisms of connecting devices (e.g., a primary device) to an application (e.g., a second device). "Long polling" generally consists of keeping a HTTP connection keep alive between the primary device and a server. If the server does not have any information available for the client, instead of sending an empty response, the server holds the request and waits for some information to be available. Once the information becomes available (or after a suitable timeout), a complete response is sent to the client. The management of these connections usually requires custom source code.

The XMPP approach contemplated by the present invention may utilize a Jabber architecture that may be used with instant messaging (IM) and Chat applications. The XMPP servers contemplated by the present invention may be configured to facilitate the functionality and management of connections to make discovery connection management transparent to client applications that use it.

The XMPP back Channel architecture contemplated by the present invention may be beneficial in leveraging the XMMP Server capabilities to integrate proprietary headend communication protocols with commercially available application and XMPP servers to create a robust and scalable back channel communication bus that allows IP devices to easily interact with Cable headend event messaging. The XMMP back-channel communications can be extended and be used as a transport connector with Message Brokers such as ActiveMQ to deliver messages. This allows devices connected to a message broker to receive the same XMPP backchannel messages as they would natively (directly) with an XMPP server. For mobile environments that rely on SMS and MMS to deliver short messages to devices, the XMMP backchannel communications can utilize SMS/MMS gateways. SMS/MMS integration is achieved through a level of indirection where instead of the backchannel communication going directly to the IP device, it is forwarded to an SMS/MSS gateway for message delivery. Many gateways (such as Oracle's SMS Gateway) understand XMMP so you can bind the SMS gateway to the XMPP server.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of providing television related information to one or more devices in response to user interaction with a set top box (STB), the STB being configured to facilitate controlling a television to output television services, the method comprising:

determining a control change for the STB resulting from a user input, the control change causing the STB to command the television to implement a corresponding operational change;

determining at least one authorized device from the one or more devices, the at least one authorized device having been previously authenticated to receive notifications regarding operation of the STB;

constructing a notification message sufficient to facilitate notifying the at least one authorized device of the control change, the notification message being constructed without the STB being aware of the at least one authorized device; constructing the notification message with an application server located at a headend configured to provide television signaling to the STB, the STB being configured to process the television signaling from the headend for output; and the application server constructing the notification message according to the Extensible Messaging and Presence Protocol (XMPP) and forwarding the notification message to an XMPP server.

2. The method of claim 1 further comprising facilitating transmission of the notification message over the Internet to the at least one authorized device, the notification message not being constructed by the STB.

3. The method of claim 2 further comprising determining the control change from a control change message transmitted from the STB in response to the user input the control change message being transmitted from the STB over a cable television medium through which television signals carrying as at least a portion of the television services are provided to the STB for output.

4. The method of claim 3 further comprising determining the control change to correspond with the user input indicating a user desiring to command the STB to implement a channel change, the channel change causing the STB to change a television channel being output to the television, the notification message being constructed following transmission of the corresponding control change message from the STB in order to subsequently provide notification of the channel change to the at least one authorized device.

5. The method of claim 3 further comprising the control change message including a first STB identifier of a plurality of unique STB identifiers and no identifiers for the at least one authorized device, the first identifier uniquely identifying the STB, and the method further comprising cross-referencing the first STB identifier with a plurality device identifiers included within a table, each device identifier uniquely identifying one of the one or more devices, the table listing one or more devices authorized to receive notifications for each of the plurality of unique STB identifiers, the at least one authorized device being the one or more devices listed for the first STB identifier, the plurality of device identifiers being unknown to the STB.

6. The method of claim 1 further comprising the XMPP server facilitating notifying the at least one authorized device of the control change with transmission of a notification command.

7. The method of claim 1 further comprising the XMPP server transmitting the notification command directly to at least one of the at least one authorized device without correspondingly the notification command to the STB.

8. The method of claim 1 further comprising the XMPP server transmitting an intermediary notification command to a short message service (SMS)/multimedia message service (MMS) gateway, the SMS/MMS gateway transmitting the notification command to at least one of the at least one authorized device.

9. A method of providing information to one or more secondary devices in response to user interaction with a Set-Top Box (STB), the STB being configured to facilitate controlling output of services, the method comprising:

determining a control change for the STB resulting from a user input, the control change causing the STB to implement a corresponding operational change in the service;

determining at least one authorized device from the one or more secondary devices, the at least one authorized device having been previously authenticated to receive notifications regarding operation of the STB, the at least one authorized device being authenticated without being identified to the STB insofar as the primary device is unable to address messages thereto; and constructing a notification message sufficient to facilitate notifying the at least one authorized device of the control change, the notification message being constructed without the STB being aware of the at least one authorized device; constructing the notification message with an application server located at a headend configured to provide television signaling to the STB, the STB being configured to process the television signaling from the headend for output; and the application server constructing the notification message according to the Extensible Messaging and Presence Protocol (XMPP) and forwarding the notification message to an XMPP server.

10. The method of claim 9 further comprising, the headend being configured to provide television related services to the primary device, the primary device being configured to process television signaling received from the headend in order to facilitate providing the television related services, the at least one authorized device being a tablet and/or a cellular phone operable to apprise a user of the control change in response to receipt of the notification message.

11. The method of claim 10 further comprising the XMPP server transmitting the notification message to the at least one authorized device identified within an identification message transmitted from an application server, the application server and the XMPP server being part of the headend.

12. The method of claim 11 further comprising the XMPP server identifying the at least one authorized secondary device from a primary device identifier provided from the application server, the application server determining the primary device identifier from data included within a control change message transmitted from the primary device, the control change message reflecting the control change resulting from the user input, the control change message being transmitted from the primary device to the application server without being transmitted from the primary device to the at least one authorized secondary device and without requiring the primary device to identify the at least one authorized secondary device.

13. The method of claim 12 further comprising the control change message being communicated to the application server through a bi-directional RF network used to carry the television signaling between the primary device and the headend.

14. A headend configured to facilitate notifying one or more secondary devices of changes in operation of a settop box (STB), the headend comprising:

a bi-directional RF Network configured to modulate television signaling for transmission to the STB, the STB demodulating the television signaling for display;

an application server configured to:

i) receive communications from the STB reflective of STB operations, the STB being unaware of the one or more secondary devices, including receiving a control change message indicating a change in operation of the STB resulting from a user input, the control change message including a unique STB identifier for the STB and no identifiers for the one or more secondary devices;

ii) generate an Extensible Messaging and Presence Protocol (XMPP) message reflective of the change in operation and the unique STB identifier; and an Extensible Messaging and Presence Protocol (XMPP) server configured to:

i) identify at least one authorized secondary device authenticated with the unique STB identifier;

ii) issue a notification message in response to receipt of the XMPP message, the notification message being transmitted at least partially over the Internet to notify the at least one authorized secondary device of the change in operation.

15. The headend of claim 14 wherein the XMPP server is further configured to:
cross-reference a plurality of secondary devices with unique STB identifiers provided for a plurality of STBs;
authenticate secondary devices actively desiring receipt of notification messages; and
identify the at least one authorized secondary device to correspond with each active secondary devices being cross-referenced with the unique STB identifier reflected within the XMPP message.

16. The headend of claim 14 wherein the application server is configured to process the control change message as received over the bi-directional RF network, the control change message being transmitted from the STB and being formatted according to Enhanced TV Binary Interchange Format (EBIF), the STB automatically transmitting the control change message in response to the user input and without identifying or being aware of any one of the one or more secondary devices.

17. The headend of claim 14 wherein the XMPP server transmits the notification message to a short message service (SMS)/multimedia message service (MMS) gateway, the SMS/MMS notifying the at least one authorized secondary device of the change in operation.

18. The headend of claim 14 wherein the application server encapsulates data reflective of the change in operation indicated in the control change message within a properties section of the XMPP message.

* * * * *

UNITED STATES PATENT AND TRADEMARK OFFICE
CERTIFICATE OF CORRECTION

PATENT NO. : 8,826,358 B2
APPLICATION NO. : 13/534238
DATED : September 2, 2014
INVENTOR(S) : Kirby, Jr. et al.

Page 1 of 1

It is certified that error appears in the above-identified patent and that said Letters Patent is hereby corrected as shown below:

Title Page, Item (12) "Kirby, Jr." should read -- Kirby, Jr. et al. --.

Title Page, Item (75) Inventor is corrected to read:
-- Josiah J. Kirby, Jr., Am Mellensee (DE);
Stephen Glennon, Lafayette (CO);
Deborah S. Fitzgerald, Superior (CO);
Douglas M. Young, Boulder (CO) --.

Signed and Sealed this
Ninth Day of August, 2016

Michelle K. Lee
*Director of the United States Patent and Trademark Office*